United States Patent

Hornsby

Patent Number: 5,937,524
Date of Patent: Aug. 17, 1999

[54] TOOL FOR CUTTING MELON FROM RIND

[76] Inventor: Colby Hornsby, 811 Live Oak Plantation Rd, Tallahassee, Fla. 32312

[21] Appl. No.: 08/949,602

[22] Filed: Oct. 14, 1997

[51] Int. Cl.$^6$ .............................. A47J 25/00; B26B 3/00
[52] U.S. Cl. ............................................ 30/113.1; 30/313
[58] Field of Search ................................. 30/113.1, 169, 30/172, 314, 315, 317, 347, 113.3, 313

[56] References Cited

U.S. PATENT DOCUMENTS

| | | | |
|---|---|---|---|
| 790,760 | 5/1905 | Stuart | 30/169 |
| 1,042,823 | 10/1912 | Richard | 30/113.3 |
| 1,370,097 | 3/1921 | Dunkley | 30/113.1 |
| 1,374,289 | 4/1921 | Dunkley | 30/113.1 |
| 2,071,691 | 2/1937 | Hayford | 30/313 |
| 3,618,208 | 11/1971 | Cronheim | 30/113.1 |

*Primary Examiner*—Hwei-Siu Payer
*Attorney, Agent, or Firm*—Malloy & Malloy, P.A.

[57] ABSTRACT

A tool for cutting and thereby separating the pulp or edible portion of a melon from the rind portion thereof comprising an elongated flexible material blade capable of being selectively disposed into either a first operative position or a second operative position. The first or second operative position into which the blade is positioned for cutting engagement with a melon is dependent upon the configuration and size of the melon which typically varies between a substantially round configuration or an elongated configuration. The first and second operative positions are respectively defined by a substantially closed loop orientation of the blade wherein the opposite ends are disposed for concurrent gripping by a single hand of the user and alternately an elongated substantially curvilinear orientation of the blade wherein the opposite ends are disposed in spaced apart relation to facilitate gripping of each opposite end by a different hand of the user, during the cutting stroke as the blade is applied to the melon.

15 Claims, 2 Drawing Sheets

TOOL FOR CUTTING MELON FROM RIND

BACKGROUND OF THE INVENTION

1. Field of the Invention

This invention relates to a tool specifically designed to separate, as by cutting, the edible portion from the rind portion of a melon. The tool incorporates a cutting blade capable of having its operative position and cutting stroke altered depending on the configuration and size of the melon being cut, subsequent to the melon being separated into substantially equally dimensioned halves.

2. Description of the Related Art

The removal of the pulp or edible portion of the fruit from the interior of a melon half is generally accomplished using conventional tools such as spoons, scoops, etc. Such conventional tools are not necessarily designed for this operation. Accordingly, utilization of such common instruments frequently results in a time consuming, relatively messy process wherein the edible portion of the melon is removed in relatively small pieces or chunks rather than as a substantially single, intact piece. The exception of this is the common usage of a scoop type instrument for forming "melon balls" wherein it is desired to form the edible portion of the melon into decorative balls which may be of varying size. The removal of the entire pulp from a watermelon of normal size would be extremely time consuming and again, would not accomplish the frequently desired purpose of removing a majority of the pulp or edible portion of the melon from the rind in a substantially intact, larger piece.

There are, of course, numerous other instruments and/or tools designed to be used in the cutting or shaping of melons or other fruits wherein it is desired to "crown" the peripheral edge rather than remove the edible portion from the rind. The term "crowning" refers to the process of forming a saw-toothed design on the outer ridges of the halves of a melon or other similarly shaped fruit. The purpose, of course, is to provide a decorative peripheral edge on the rind portion of the fruit which may be of primary interest in the areas of catering or restaurant businesses, as well as for use at home where a decorative melon is desired for festive events or larger gatherings. Typically, such crowning tools incorporate a handheld device which includes a cutting blade having a generally corrugated configuration. Alternately, certain hand-held tools are designed for the forming of such decorative, peripheral edges about the melon half rind using a single substantially V-shaped cutting blade applied continuously to the rind of the melon in a penetrating fashion.

While the above tools and instruments are well-known, none are specifically designed to accomplish the removal of the pulp or edible portion of a melon, regardless of its size or configuration, utilizing a single or minimal number of cutting strokes. Accordingly, there is a need in the art for a cutting tool assembly specifically designed to remove a desired, majority of the edible portion of the melon from a rind portion thereto, wherein the edible portion is removed by one or two cutting strokes. In addition, watermelons are generally available in two different configurations, namely a substantially round configuration and a substantially elongated configuration, and as such, any such cutting tool should be capable of removing the pulp or edible portion from a watermelon, regardless of its configuration, without requiring the assistance of additional tools and or requiring a user to maintain a plurality of tools in varying sizes. Accordingly, the cutting blade of such a preferred cutting tool should be capable of being selectively positioned or oriented in different configurations before the cutting process begins, in order to accommodate the melon's configuration. Preferably, the selective positioning of such a cutting blade should ensure that a cutting edge thereof will be continuously maintained at the junction between the edible portion of the melon and the rind portion of the melon. Also, the selective altering of the position of the cutting blade to adapt it for use on melons of varying sizes and shapes should be possible without major mechanical adjustments of the tool or a restructuring of the tool or its components.

SUMMARY OF THE INVENTION

The present invention relates to a cutting tool assembly specifically designed to remove the majority of the pulp or edible portion of a melon from the melon rind in an efficient manner which is less time consuming than using known or conventional cutting tools. The cutting tool assembly of the present invention is described primarily for use on watermelons. However, it should be noted that the tool is equally proficient in removing the pulp from other types of melons including but not limited to cantaloupes, honeydew melons, etc. Furthermore, the cutting tool assembly of the present invention is preferably designed to remove the edible portion of the melon from the rind regardless of the melon's configuration, and subsequent to its being cut in substantially equally dimensioned halves.

The cutting tool assembly of the present invention preferably comprises an elongated cutting blade formed of a flexible material such as but not limited, to a metallic material or a high-strength plastic material. While other materials could be utilized, the material from which the cutting blade is formed should have sufficient flexibility to allow selective positioning of the cutting blade between a first operative position and a second operative position. The operative position in which the blade is positioned is dependent upon the configuration, and to a certain extent, the size of the melon. Typically, watermelons are available in either a substantially spherical or round configuration or alternatively, an elongated configuration. The first operative position of the cutting blade is used on a substantially round or spherically configured melon. The second operative position of the cutting blade is used when the melon being cut has a substantially elongated configuration. In either operative position, the cutting blade is manipulated by a user of the cutting tool assembly such that the cutting blade preferably passes through the melon generally at the junction of the edible portion and the inedible portion by means of one or two strokes being exerted by the user of the cutting tool assembly.

More specifically, when the cutting blade is oriented in the first operative position, it preferably defines what may considered a substantially closed loop wherein the opposite ends of the cutting blade are disposed and maintained in an immediately adjacent and/or contacting relation to one another. In such position, both of the opposite ends may be gripped by a single hand of the user wherein the opposite hand of the user may hold or steady the melon being cut. Another feature of the present invention associated with this embodiment includes a gripping assembly structured to maintain the opposite ends of the cutting blade into a position capable of being gripped by a single hand of the user. The gripping assembly includes an elongated substantially hollow sleeve having at least one open end. The sleeve is generally designed to pass in a somewhat telescopic relation over the adjacently positioned and aligned opposite ends of the blade and maintain this position of the opposite ends during use of the tool. The sleeve itself may be formed of a variety of different materials dependent upon the embodiment being utilized. For example, the sleeve may be made of a high strength, semi-rigid, but at least minimally flexible material, such that force exerted on opposite sides of the sleeve by the gripping hand of the user will in turn, force the opposite ends of the blade into flush engagement with one another. The opposite ends will preferably not become inadvertently displaced from the sleeve or the gripping hand of the user during the performance of the cutting stroke on the melon due to the force exerted thereon.

In an alternate embodiment, the opposite ends of the cutting blade may be held in an adjacent and/or flush engagement with one another by virtue of a cross member extending transversely through the sleeve and through, aligned apertures in both the sleeve and each of the opposite ends of the cutting blade. This cross member not only serves to retain the opposite ends in the desired position for gripping, but also allows a rotational movement to be applied to the cutting blade such that the cutting blade may be rotated about the length or longitudinal axes of the opposite ends of the cutting blade and the attached sleeve. Such a rotational movement is applied especially when dealing with substantially spherical or round melons. In applying this method of cutting, the user provides an arcuate cutting stroke which has a tendency to initially scoop out at least a half of the portion of the melon being cut. Once the cutting blade reaches an approximate half way position, it is disposed in a substantially outwardly extending, perpendicular relation to the surface of the melon being cut. The cutting blade is then rotated by turning the cross member, once the tool is in this upright or perpendicular position. More specifically, the user of the blade exerts a turning force on the cross member which results in the aforementioned rotation of the cutting blade substantially about the length or longitudinal axes of the opposite ends of the cutting blade as well as the sleeve which retains them. This movement of the cutting blade ensures the vast majority if not all of the edible portion of the melon being removed as well as clean cutting strokes being performed.

The second operative position is defined by the cutting blade being disposed in a substantially elongated curvilinear configuration wherein the opposite ends of the cutting blade each define a handle portion and may include structure thereon to facilitate gripping by a different hand of the user. The orientation of the cutting blade when in this operative cutting position defines somewhat of a U-shaped configuration generally conforming to the cross-sectional configuration of the melon which it is cutting. In that both hands of the user are used to grip the opposite ends or handle structures of the cutting blade, a stabilizing structure or a second person may be needed to secure the melon during the cutting operation. It should therefore be recognized that the flexibility of the material from which the cutting blade is formed should allow orientation of the cutting blade in either of the aforementioned first and second operative positions, depends upon the overall size and configuration of the melon being cut.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying Figures, the present invention relates to a cutting tool assembly specifically designed to remove, through cutting, the pulp or edible portion of the melon from the inedible portion thereof. The various embodiments of the subject cutting tool assembly are shown in FIGS. 1 and 2.

The cutting tool assembly of the present invention comprises a cutting blade generally indicated as 10, having an elongated configuration terminating in opposite ends, as at 12 and 14. The cutting blade 10 is formed of a flexible material such as, but not limited to metal, plastic, etc. One feature of the present invention is the ability to selectively orient the cutting blade 10 in either a first operative position generally represented in FIG. 1 or a second operative position generally represented in FIG. 2. Therefore, the flexibility of the material from which the cutting blade 10 is formed, should be sufficient to allow the user of the subject cutting tool assembly to easily orient the cutting blade 10 between the substantially closed loop configuration of FIG. 1 and the opened, elongated, curvilinear, substantially U-shaped configuration of FIG. 2. Further, in the first operative position or closed looped orientation of FIG. 1, the opposite ends 12 and 14 are disposed in immediately adjacent, side by side relation and/or in flush engagement with one another. This closed loop configuration of the remainder of the cutting blade may be maintained during the cutting stroke which will be described in greater detail hereinafter. To the contrary, the second operative position as shown in FIG. 2 disposes the opposite ends 12 and 14 of the cutting blade in spaced apart relation so that each may be gripped by a different hand of a user of the subject cutting tool assembly. To facilitate such individual gripping, the inner and/or outer surfaces as at 12' and 14' may be irregularly configured or otherwise structured to facilitate direct gripping engagement with these opposite ends. Also, the surface structure of the opposite ends may be such as to facilitate immovable engagement with one another in accordance with the embodiment of FIG. 6.

Figure 1:
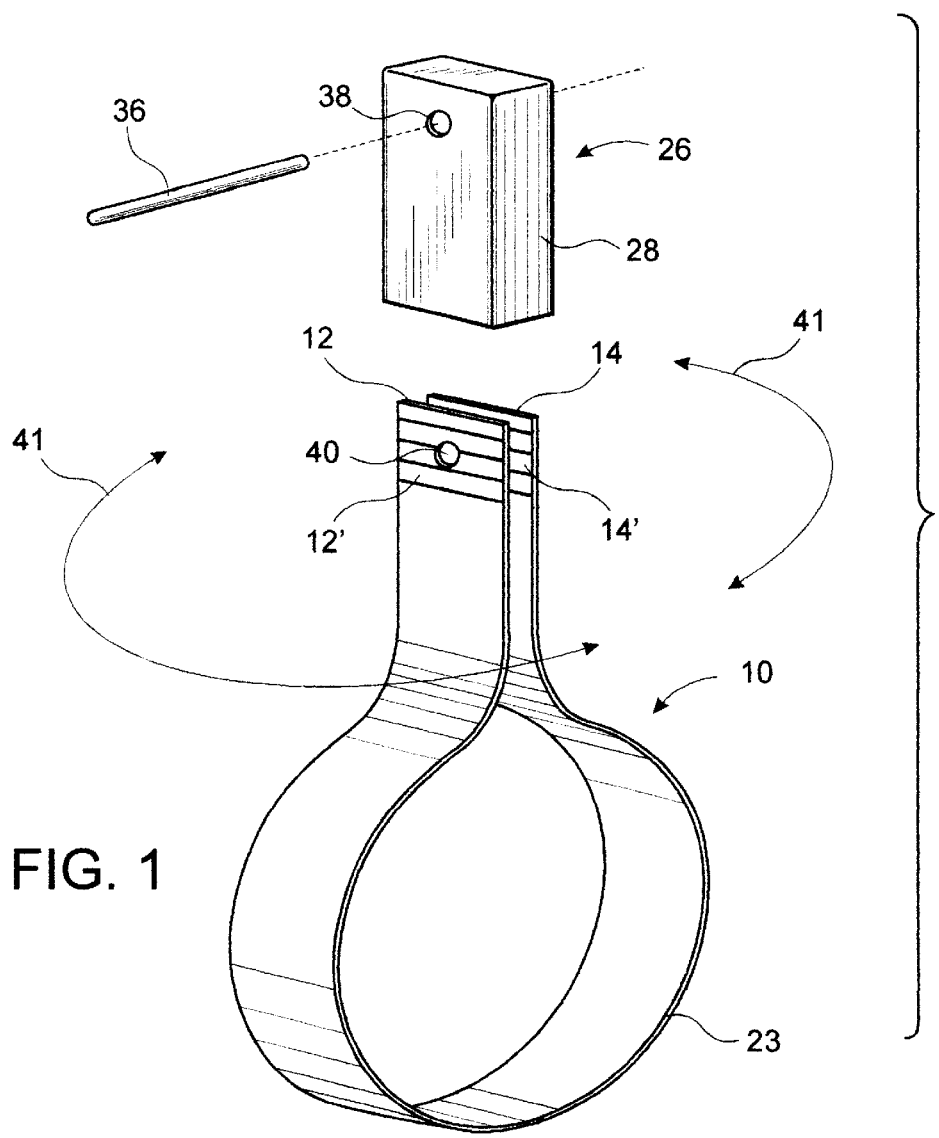
FIG. 1 is an exploded view of one embodiment of the present invention.
Figure 2:
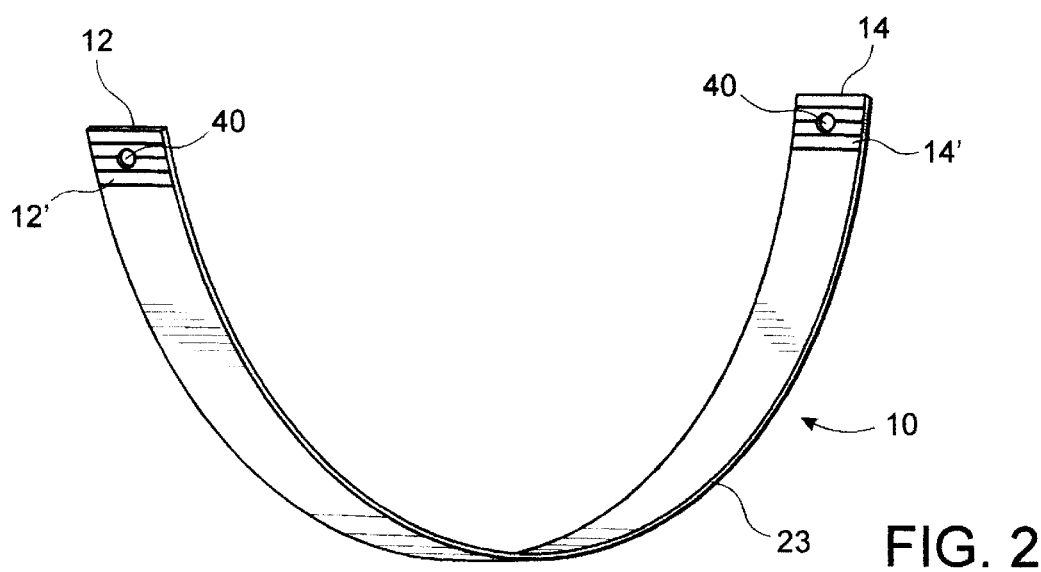
FIG. 2 is a perspective view of yet another embodiment of the present invention.
Figure 3:
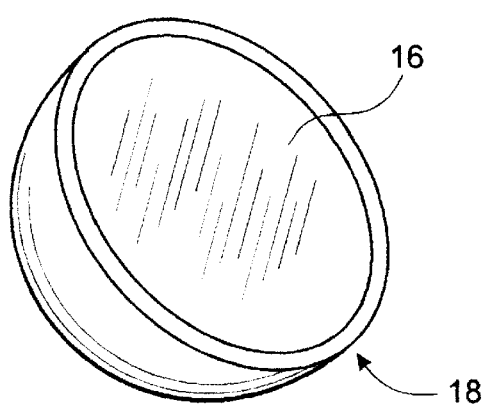
FIG. 3 is a perspective view of a typical size and configuration of a melon which the cutting assembly of the present invention is intended to cut.
Figure 4:
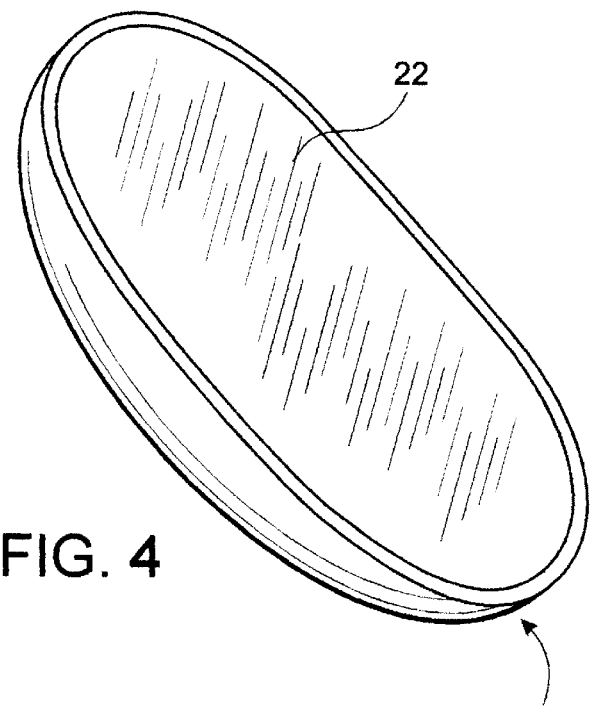
FIG. 4 is a perspective view of yet another size and configuration of a melon being capable of being cut by the structure of the present invention.

With reference to FIGS. 3 and 4, the versatility of allowing the cutting blade 10 of the subject cutting tool assembly to be positioned between the first operative position of FIG. 1 and the second operative position of FIG. 2 is deemed necessary due to the well recognized fact that watermelons, as well as other types of melons, generally come in either a spherical configuration of FIG. 3 or an elongated configuration as shown in FIG. 4. It should be noted that the first operative, closed looped configuration of FIG. 1 is designed to remove the edible portion as at 16 from the round or spherical melon 18. Alternately, when a melon as at 20 has a substantially elongated configuration, the pulp or edible portion 22 is more effectively removed when the blade 10 is in the second operative position as shown in FIG. 2.

Figure 7:
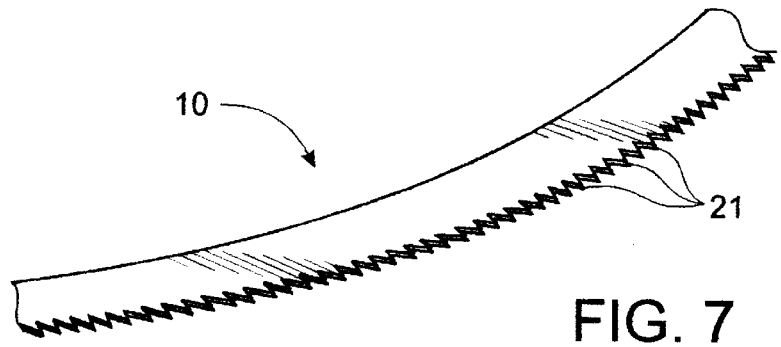
FIG. 7 is a perspective view in partial cut-away showing structural details of the embodiments of FIGS. 1 and 2.

Regardless of the orientation or position the cutting blade 10 assumes, it should be noted that at least one longitudinal edge of the cutting blade is specifically structured to be sharpened and thereby, define a cutting edge at least along a portion thereof. FIG. 7 shows the specific sharpened structure of the cutting edge in the form of a plurality of consecutive teeth disposed to define a serrated cutting edge configuration as at 21. However, one of the longitudinal cutting edges as at 23 in FIGS. 1 and 2 may take any of a variety of configurations to ensure that at least one of the longitudinal edge portions of the blade 10 is in fact sharpened.

Figure 5:
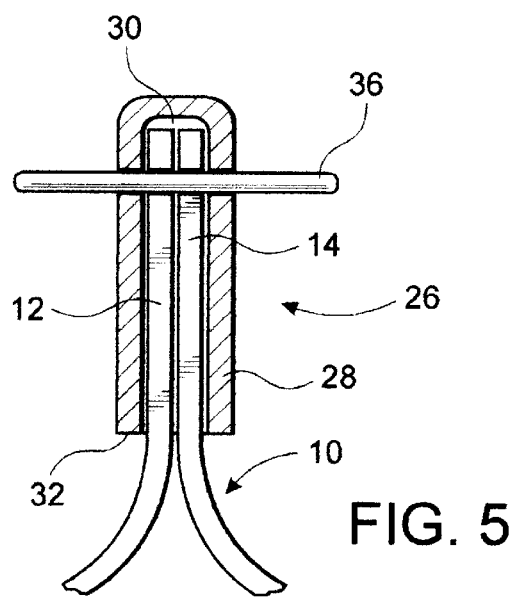
FIG. 5 is a sectional view in partial cut-away showing structured details of the embodiment of FIG. 1.
Figure 6:
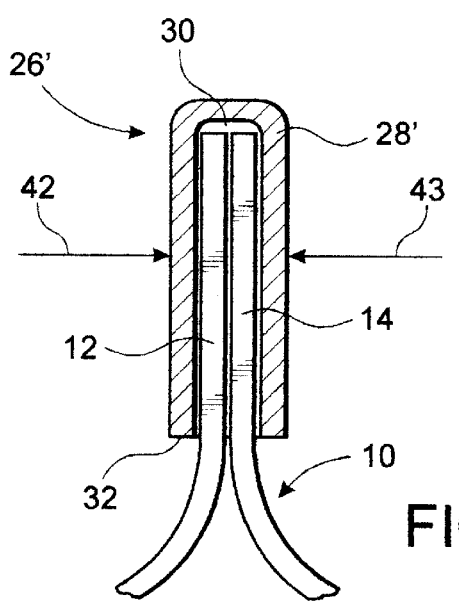
FIG. 6 is a sectional view in partial cut-away showing another embodiment of the present invention.

With reference to FIGS. 1, 5 and 6, one preferred embodiment of the present invention includes a gripping assembly generally indicated as 26. The gripping assembly comprises a main body portion in the form of a substantially elongated sleeve as at 28 having an at least partially hollow interior as at 30 and having at least one open end as at 32. The sleeve 28 is structured so as to be telescopically fitted over the exterior of the opposite ends 12 and 14 when the cutting blade 10 is in the first operative position or substantially closed loop orientation of FIG. 1. Further, the sleeve is dimensioned and configured to retain the opposite ends 12 and 14 in their immediately adjacent and/or substantially flush engagement with one another during the movement or travel of the cutting blade through a melon 18 having the configuration shown in FIG. 3. As set forth above, the opposite ends 12 and 14 are maintained in the indicated position of FIGS. 1, 5 and 6, by means of the provision of a sleeve 28. The tool assembly may therefore be gripped by a single hand of the user of the assembly.

Another feature of the gripping assembly 26 includes, at least in the embodiments of FIGS. 1 and 5, a cross member as at 36. The cross member 36 is designed to pass through the sleeve 28 by means of a pair of apertures as at 38 formed in each side of the sleeve 28. Further, in order to aid in maintaining the opposite ends 12 and 14 in the desired position shown in FIG. 5, appropriately positioned apertures as at 40 are also formed in each of these opposite ends. With reference to FIG. 5, the cross member 36 is then arranged in a transverse relation to the sleeve 28 as well as the opposite ends 12 and 14 by first aligning the apertures 38 of sleeve 28 and the apertures 40 of the opposite ends 12 and 14. When the apertures are so aligned, the cross member 36 is transversely oriented in a retaining position, as best shown in FIGS. 5. Inadvertent displacement or removal of the opposite ends 12 and 14 from their retained preferred position within the sleeve 18, as shown in FIG. 5, is thereby eliminated. Further, the structure and disposition of the cross member 36 is such as to allow a rotary motion of the cutting blade 10 to occur once it has at least cut half way through the edible portion 16 of a spherically configured melon 18 (FIG. 3). When pulled through the melon 18 in a somewhat arcuate path, the cutting blade as well as the remainder of the cutting tool assembly of FIG. 1 will be in a somewhat upright position as shown in FIG. 1. In such position, a rotational force can be exerted on the cross member 36 which will be transferred to the sleeve 28 as well as the opposite ends 12 and 14. This rotational force will cause the blade 10 to rotate about a length of the opposite ends 12 and 14 or a longitudinal axes of the opposite ends 12 and 14 and the sleeve 28 as generally indicated by directional arrows 41. A more efficient cutting stroke will be performed resulting in the edible portion 16 being removed from melon 18 in a substantially hemispherical configuration.

Alternately, the embodiment of FIG. 6 eliminates the need for the cross member 36 and instead has a gripping assembly 26' comprising the sleeve 28' formed from a high strength but at least minimally flexible material such as plastic or the like. Further, in this embodiment, the apertures 38 in the sleeve 28 as well as the apertures 40 in the opposite ends 12 and 14 may be eliminated. The opposite ends 12 and 14 are maintained in their immediately adjacent or contacting relation to one another as shown in FIG. 6 by oppositely applied forces as indicated by directional arrows 42 and 43. These forces may be applied to the at least minimally flexible side walls of the sleeve 28' due to the gripping force exerted on the sleeve by a single hand of the user of this embodiment of the present invention. Further the outer surfaces of the opposite ends may include an irregular configuration or other structure which facilitates these opposite ends maintaining engagement with one another when the aforementioned forces are applied.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A cutting tool assembly designed to separate an edible portion of a melon from a rind portion thereof, said cutting tool assembly comprising:
   a) a cutting blade having an elongated configuration and terminating at opposite ends, each opposite end dimensioned and configured to be gripped by a different hand of a user,
   b) said cutting blade being formed of a material of sufficient flexibility to be selectively disposed between a first operative position and a second operative position,
   c) said first operative position configured to cut melons having a substantially spherical configuration and at least partially defined by said cutting blade disposed into a substantially closed looped configuration having said opposite ends correspondingly disposed in adjacent relation such that both said opposite ends may be concurrently gripped by a single hand of a user,
   d) said second operative position configured to cut melons having a substantially elongated configuration and at least partially defined by said cutting blade disposed into a substantially elongated, curvilinear configuration having said opposite ends disposed in spaced apart relation such that each opposite end of said cutting blade is gripped by a different hand of a user, and
   e) said cutting blade including at least one longitudinal edge extending along a portion of the length thereof and being structured to define a cutting edge when said cutting blade is in either said first or second operative position.

2. A cutting tool assembly as in claim 1 further comprising a gripping assembly removably attached in retaining engagement with both said opposite ends of said cutting blade when in said first operative position, said gripping assembly structured to maintain said opposite ends into a substantially aligned, relatively immovable engagement with one another.

3. A cutting tool assembly designed to separate an edible portion of a melon from a rind portion thereof, said cutting tool assembly comprising:

a) a cutting blade having an elongated configuration and terminating at opposite ends, b) said cutting blade formed of a material of sufficient flexibility to be selectively disposed between a first operative position and a second operative position, c) said cutting blade disposed in said first operative position to cut melons of a first predetermined configuration and disposed in said second operative position to cut melons of a second predetermined configuration, d) said first operative position at least partially defined by said cutting blade disposed into a substantially closed looped configuration, e) each of said opposite ends of said cutting blade being structured and dimensioned to be held by a different hand of a user, and f) said cutting blade including at least one longitudinal edge extending along at least a portion of the length thereof and being structured and disposed to define a cutting edge of said cutting blade.

4. A cutting tool assembly as in claim 3 wherein said first operative position is further defined by said opposite ends of said cutting blade correspondingly disposed in substantially adjacent relation such that both said opposite ends may be gripped by a single hand of a user.

5. A cutting tool assembly as in claim 4 wherein said cutting blade has a sufficient length to position and maintain said cutting edge substantially along a junction between the edible portion and the rind portion of the melon during a cutting stroke when said cutting blade is in said first operative position.

6. A cutting tool assembly as in claim 4 further comprising a gripping assembly removably mounted in retaining engagement with both said opposite ends correspondingly disposed in substantially adjacent relation to one another when said cutting blade is in said first operative position.

7. A cutting tool assembly as in claim 6 wherein said gripping assembly comprises a main body portion configured and dimensioned to maintain said opposite ends of said cutting blade into substantially aligned relation to one another along at least a portion of the length at each opposite end.

8. A cutting tool assembly as in claim 7 wherein said gripping assembly further comprises a cross member mounted on said main body portion and disposed in substantially transverse relation to the length of said opposite ends, said main body portion and said cross member cooperatively structured and disposed to rotate said cutting blade about a longitudinal axis of said opposite ends when a rotating force is applied to said cross member by a hand of a user.

9. A cutting tool assembly as in claim 8 wherein said cross member is removably connected to said main body portion and is disposed in retaining engagement with both said opposite ends of said cutting blade.

10. An assembly as in claim 7 wherein said main body portion comprises a sleeve having a hollow interior and dimensioned and configured to be positioned in telescoping, engagement over both said opposite ends of said cutting blade, said sleeve further dimensioned and configured to be gripped by a single hand of a user when in retaining engagement with said opposite ends of said cutting blade.

11. A cutting tool assembly as in claim 10 further comprising a cross member removably connected to said sleeve and transversely disposed in retaining engagement with said sleeve and both said opposite ends of said cutting blade.

12. A cutting tool assembly as in claim 10 wherein said sleeve is formed at least in part of a material of sufficient flexibility to provide inward movement of portions of said sleeve and forced engagement with said opposite ends, said opposite ends forced into flush, retaining engagement with one another due to the gripping force exerted on said portions of said sleeve by one hand of a user.

13. A cutting tool assembly as in claim 12 wherein said opposite ends are structured and configured to enhance fixed relative positioning of said opposite ends when forced into engagement with one another.

14. A cutting tool assembly designed to separate an edible portion of a melon from a rind portion thereof, said cutting tool assembly comprising:

a) a cutting blade having an elongated configuration and terminating at opposite integrally formed ends, each of said ends having at least one of its inner and outer surfaces configured to facilitate gripping engagement of said opposite ends by a user, b) said cutting blade formed of a material of sufficient flexibility to be selectively disposed between a first operative position and a second operative position, c) said cutting blade disposed in said first operative position to cut melons of a first predetermined configuration and disposed in said second operative position to cut melons of a second predetermined configuration, d) said second operative position at least partially defined by said cutting blade disposed into a substantially elongated, curvilinear configuration having said opposite ends of said cutting blade disposed in spaced apart relation, e) each of said opposite ends of said cutting blade being structured and dimensioned to be held by a different hand of a user, and f) said cutting blade including at least one longitudinal edge extending along at least a portion of the length thereof and being structured and disposed to define a cutting edge of said cutting blade.

15. A cutting tool assembly as in claim 14 wherein said elongated curvilinear configuration of said cutting blade may be selectively varied to position and maintain said cutting edge substantially along a junction between the edible portion and the rind portion of the melon during a cutting stroke of the cutting blade when in said second operative position.

\* \* \* \* \*